July 10, 1951
R. S. WALKER
2,560,016
METHOD OF AND MEANS FOR PRODUCING MILK OF
LIME AND FOR CAUSTICIZING GREEN LIQUOR
Filed Jan. 5, 1948
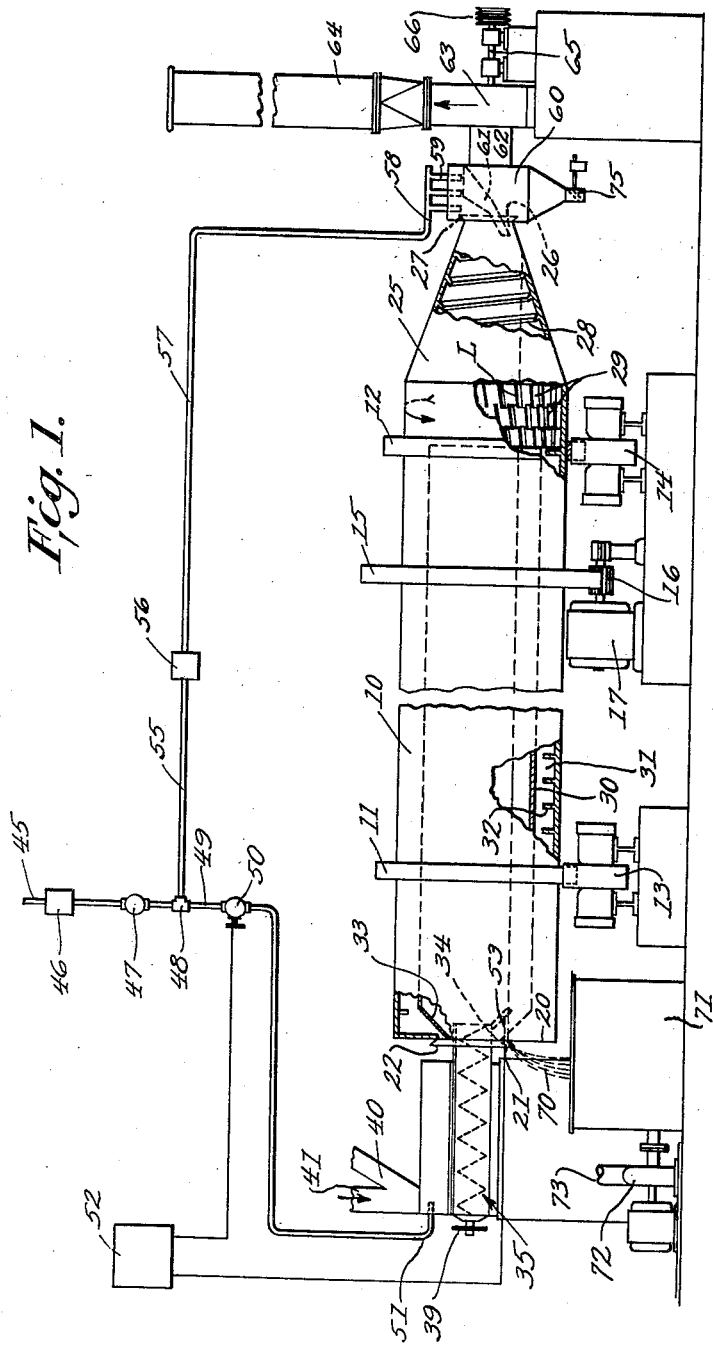
Inventor
Robert S. Walker
By Cushman, Darby & Cushman
Attorneys Patented July 10, 1951

2,560,016

UNITED STATES PATENT OFFICE 2,560,016

METHOD OF AND MEANS FOR PRODUCING MILK OF LIME AND FOR CAUSTICIZING GREEN LIQUOR

Robert S. Walker, Allentown, Pa., assignor to Traylor Engineering & Manufacturing Company, Allentown, Pa., a corporation of Delaware Application January 5, 1948, Serial No. 574

4 Claims. (Cl. 23—188)

The present invention relates to methods of and apparatus for slaking lime and for causticizing green liquor in paper fiber liberation processes and the like. In my prior applications, Serial Nos. 612,459, filed August 24, 1945, now abandoned, and 649,056, filed February 20, 1946, certain improved methods and machines for doing the same work are shown, described, and claimed, and the invention of the present application is in the nature of an improvement on the methods and machines there shown.

The prior applications explain that a slaked lime, such as milk of lime, having vastly improved physical properties may be produced by accurately controlling, in a continuous process, as distinguished from a batch process, the amount of slaking liquid initially reacted with the lime, thereby to control the temperature of the slaking reaction. According to the methods and machines described in my prior applications, the amount of slaking liquid continuously added to a moving mass of non-slaked lime, fed at a predetermined, controlled, constant rate in pounds per minute, is controlled by the temperature in the slaking zone, so as to maintain the temperature substantially constant. If the temperature rises, for one reason or another, more liquid is added, thereby to reduce the temperature, and vice versa. By accurately controlling the temperature, a slaked lime having improved physical characteristics is produced. The lime particles are in the form of minute grains, blocks, or granules of substantial density, as distinguished from thin flakes having relatively large surface areas compared to thickness.

In the processes of the previously filed applications, the slaking action, with the accurately controlled delivery of liquid, results in a thick, heavy, viscous mass of slaked lime of putty-like or cottage cheese-like consistency. Additional liquid is added to this heavy slaked lime, in a continuation of the process, to produce a milk of lime of the desired consistency or viscosity, but without in any way affecting the sizes or shapes of the individual lime particles, thereby avoiding the production of the flake-like particles of the prior art.

The invention of the present application is concerned primarily with a pre-slaking or preliminary mixing of the non-slaked lime with water or other slaking liquid, in accurately controlled proportions, to make certain that there is an initial thorough mixing of the lime and the slaking liquid, to the end that each particle of lime shall be coated or have associated therewith a sufficient amount of liquid to start the slaking reaction, and to avoid any possibility that certain particles of lime might be associated with an excess of water while others might have insufficient water to complete the slaking reaction and to produce the slaked lime particle form and shape with which the invention is concerned.

It is the primary object of the present invention, therefore, preliminarily to mix with a continuously moving mass of non-slaked lime, a temperature controlled amount of slaking liquid, and to do this preliminary mixing in a rapid, thorough manner, so that each particle of lime has associated therewith a definite amount of liquid, to permit the slaking reaction to continue after the preliminary mixing for the desired length of time and to produce a viscous reaction product of putty-like consistency having the desired particle shapes described above.

A further important object of the invention is to provide means for greatly increasing the output of a rotary slaker of given size, by providing means, ahead of the slaker, for preliminarily mixing the lime and slaking liquid, so that this operation need not be performed in the slaker proper, with the result that the material may be fed through the latter more rapidly.

It is a further object of the invention to control the rate of the delivery of the slaking liquid to the preliminary mixing zone in accordance with the temperature of the lime and liquid leaving that zone and entering the prolonged slaking zone.

A further object of the invention is continuously to dilute the thick, heavy slaked lime by the delivery of liquid thereto, at the completion of the slaking operation, and to control the delivery of the last mentioned liquid in inverse ratio to the delivery of slaking liquid to the preliminary mixing zone, to the end that a milk of lime of constant, predetermined viscosity is produced.

Another object is to provide a method of and apparatus for producing a very dense milk of lime, that is, one having an unusually high lime content, but which has a reasonably low viscosity so that it is capable of being pumped and conducted through conventional pipe lines.

Another object of the invention is to provide new and improved machines and combinations of apparatus instrumentalities for performing the improved method steps.

Other and further objects and advantages of the invention will be apparent from a consideration of the following description of a preferred embodiment, the apparatus of which is shown for purposes of illustration in the accompanying drawings, in which:

Figure 1 is a diagrammatic side elevation and partial section of the apparatus, and Figure 2 is a section and elevation of a mill which may be used for pre-slaking or pre-mixing the slaking liquid and lime.

Referring to the drawings, a cylindrical drum or shell 10 of any suitable construction is supported for rotation by rings 11, 12, mounted on pairs of rollers 13, 14, as is well understood in the rotary kiln field. The shell carries a large gear 15, in mesh with a driving pinion 16 on the shaft of a motor-speed reducer 17, by which rotation is imparted to the shell.

At the left or head end the shell is provided with an annular end wall 20, defining a circular opening 21 having its center on the axis of the shell. The margin of the opening 21 is provided with an outwardly flaring conical flange 22.

At the right or foot end, the shell is provided with a tapering conical portion 25, terminating in a central opening 26 of reduced diameter, defined by an outwardly flaring flange 27. The inner surface of the conical portion carries an inwardly projecting spiral rib 28, for purposes hereinafter described.

Mounted within the shell or drum 10 is an inner cylindrical shell or drum 30, leaving a space 31 between the inner and outer shells. An inwardly projecting spiral rib 32, pitched in the same direction as the spiral rib 28, is fixed to the inner surface of the drum 21, spaced outwardly from the inner drum or shell 30, except that the rib may include spoke-like extensions for supporting the inner drum. At its head end, the inner drum has a tapered, conical portion 33 whose outer extremity defines a circular opening 34 having its center on the drum axis, and having its margins spaced inwardly of the margins of the end wall 22, thereby providing an annular space between the concentric end edges of the inner and outer drums or shells.

The axial length of the inner surface of the outer drum, between the end of the inner drum and the conical end portion 25 may be provided with a plurality of inwardly projecting flights, paddles or lifters 29, inclined slightly from axial planes, in the same direction as the ribs 28 and 32.

The parts so far described may be substantially identical to the corresponding parts shown in my pending application, Serial No. 649,056, filed February 20, 1946.

At the left hand or head end of the rotary drum or shell is a paddle mixer or pug mill 35, having its right hand, discharge end projecting inwardly into the central opening 34 of the inner shell 30. As is well understood in the mill art, the paddle mixer 35 may include a spiral rib 36 and a plurality of spaced, radially projecting, oppositely pitched paddles 37, all carried by a common central shaft 38, adapted to be rotated by a sprocket 39 from any suitable source of power.

A lime feeding chute 40 delivers lime to the pug mill 35 from a suitable adjustable lime feeding device, adapted to supply the lime at an accurately controlled, constant rate in pounds per minute. Connected to the lime feed chute, preferably at its point of delivery to the pug mill is a branch conduit 41 communicating with atmosphere and constituting a vent, for purposes hereinafter described.

Slaking liquid, such as water or green liquor from a paper pulp digesting process, is delivered from a suitable source of supply by a pipe 45 through a pressure regulator 46 to a flow meter 47. Where the pressure from the supply in the pipe 45 is not subject to substantial variations, the pressure regulator 46 may be omitted. The flow meter 47 is preferably adjustable and may be set to deliver an accurately predetermined flow of liquid to the system, correlated with the flow of lime delivered by the lime feeder to the chute 40, to produce a milk of lime or other end product of the desired consistency. From the flow meter, the liquid goes to a T-fitting 48, having one branch 49 leading through a temperature control valve 50, to the pug mill 35 by a pipe extension 51. The temperature control valve 50 is connected to and operated by a controller 52 which, in turn, is controlled by a thermocouple 53, positioned at the discharge end of the pug mill, within the inner drum 30, at the head end thereof, and arranged to take the temperature of the material therein and to affect the controller 52 accordingly. The latter in turn opens or closes the valve 50, more or less, to deliver varying amounts of liquid to the pug mill, or to maintain the delivery constant, as the case may be.

The other branch pipe 55 from the T-fitting 48 leads through a pressure regulator 56 and a pipe extension 57 to a header 58 having a plurality of spray devices 59 communicating therewith, the sprays being disposed within a casing 60, having an opening encircling the flanged end 27 of the conical portion 25 of drum 10. Within the casing 60 is a trough 61 having its end extending into the opening 26 in spaced relation to the margin thereof.

The pressure regulator 56 is so set that there is always a preferential flow of liquid from the flow meter 47 through pipe 49 and extension 51 to the pug mill, and flow through the pressure regulator 56 and pipe extension 55 to the spray 59 occurs only because of the throttling effect of the temperature control valve 50. In other words, the excess of the slaking liquid, not required at the pug mill, because of the temperature conditions existing at the discharge end thereof, measured by thermo-couple 53, is delivered through the pressure regulator 56, pipe 57 and spray 59, to the foot end of the drum 10 for diluting purposes.

The casing 60 is in communication through a duct 62 with the intake of a blower housing 63 adapted to deliver gases to a stack 64, the blower in the housing being driven by a shaft 65 having a V-belt pulley 66 on the end thereof. The spray tends to condense steam and lay any dust which might be drawn into the casing 60, and the blower 63 continuously draws air inwardly through vent 41, thereby preventing any escape of steam and dust at the lime infeed junction with pug mill 35 and possible clogging of the chute 40.

In the operation of the apparatus and in carrying out the process in accordance with the present invention, the non-slaked lime, fed at a predetermined rate through chute 40 is quickly, thoroughly and completely mixed in the pug mill 35 with an accurately predetermined volume of slaking liquid fed to the pug mill by pipe 51, the volumes of lime and liquid being accurately determined so that just the amount of liquid necessary to slake the lime and to produce a heavy, putty-like end product is applied. In the pre-slaker 35, each particle of lime quickly has associated therewith the correct amount of liquid to complete the slaking thereof in the most effective manner. It will be understood that the slaking is only started in the pug mill 35 and that the primary purpose thereof is to effect the thorough covering of each piece of lime with liquid. The material is fed continuously from the discharge end of the pre-slaker into the inner drum 30, where its temperature is determined by the thermo-couple 53. The material is constantly tumbled, mixed and moved toward the foot end of the inner shell or drum and, during its passage therethrough, the slaking reaction continues. If the temperature rises above a predetermined maximum or falls below a predetermined minimum, as determined by thermo-couple 53 and controller 52, more or less slaking liquid is delivered by the valve 50, to correct the temperature conditions and to bring the same within the predetermined, narrow range.

The slaked lime, alone or in combination with other solids and liquids, in the inner drum is relatively heavy, of putty-like or cottage cheese-like consistency and normally rises above the liquid level indicated at line L. As the material reaches the end of drum 30, it falls over into the outer drum 10, where it is diluted by the diluting liquid delivered by sprays 59 and trough 60 to the interior of the drum. This action is facilitated by the flights 29, which break up the heavy material and mix it with the liquid. As the diluting continues, the milk of lime or other suspension so formed flows toward the head end of the drum, and is constantly scrubbed or worked by the spiral rib 32, fixed to the inner periphery of the outer drum and pitched in the opposite direction to the flow of the material. Hence, the suspension of solid particles in liquid flows in the space between the inner edges of the successive convolutions of the spiral rib and the outer surface of the inner drum, toward the head end, until it overflows through the annular opening 21 over the flange 22 as indicated at 70, into a collecting tank 71, from which point it may be delivered by a motor driven pump 72 through a discharge pipe 73 to any appropriate point.

The spiral rib 32, the flights 29 and the spiral rib 38 are pitched in the same direction and the drum is rotated so that all impurities, grits, and tailings are engaged by the ribs and flights and are fed toward the right or foot end of the drum, for discharge through the opening 26 into the casing 60, from which point they may be removed from time to time by a gate 75.

The level of the milk of lime or other suspension in the drum, as indicated at L is determined by the height of the lower portion of the opening 21, over which the material flows through the tank 71.

Depending upon the characteristics desired in the ultimate particles of slaked lime (or slaked lime and calcium carbonate, if the slaking liquid is, for instance, green liquor), a certain slaking temperature must be maintained. This temperature will be somewhere between 150° and 200° F. Due to the variables encountered, no definite temperature of general application can be specified, but the required temperature can be readily determined as soon as the plant is set up. In order that the particles in the final product shall be in the form of minute grains, blocks or granules, as distinguished from flakes, so as to make the product suitable for separation in a centrifuge, the temperature at the end of the pre-slaking zone may be, for example, substantially 186° F. In that case, the controller 52 is set at this figure and the valve 50 will assume an adjustment such that sufficient slaking liquid will be supplied to the pre-slaker by pipe 51 to maintain the set temperature. This may require, for example, approximately one-third of the amount of liquid delivered to the system by the flow meter 47.

In order to obtain the required cooling effect, it is always necessary to supply more slaking liquid than the minimum necessary for the completion of the reaction and, consequently, the resultant or reaction product, will always be of a putty-like or cottage cheese-like consistency instead of being in a dry condition. The resultant or reaction product moves toward the foot end of the slaking chamber due to the rotation of the inner drum and the continued feed of mixed lime and slaking liquid at the head end, by the pug mill 35. The mill 35 and the inner drum 30 are sufficiently long with respect to the rate of feed so that the reaction will be completed and the product will break down to the putty-like consistency above mentioned.

This consistency will, of course, vary under different conditions. For example, if the slaking liquid is relatively cold, less will be required for cooling than if it were relatively warm, assuming that the rate of lime fed remains constant. However, there is always an excess of liquid beyond the minimum required for the reaction, but the excess will be far short of that required to produce a low viscosity milk or suspension and, hence, the slaked lime and other reaction products, if present, will emerge from the foot end of the slaking chamber in the aforementioned putty-like consistency and will drop into the outer chamber defined by the drum 10, in the zone between the end of the inner drum and the conical end portion 25. At this point, the flights or lifters 29 will engage the thick material, break it up and assist in mixing it with the incoming diluting liquid.

As a result of the use of the method and apparatus described in the present application, in actual commercial practice, an unusually dense milk of lime, yet capable of being pumped and conducted through pipes, has been produced. Using a titer test, which in effect consists in determining the number of cc.'s of normal acid required to neutralize 20 cc. of milk of lime solution, it has been found that much higher concentrations of lime are produced in accordance with the present invention than were possible heretofore. In the past, as far as applicant is aware, it had been impossible to get a titer test of over 180 and, at the same time be able to pump the milk of lime through pipe lines. In accordance with the present invention, commercial production of milk of lime with a titer test of 210 is standard procedure and this product is more readily pumped and conducted through pipe lines than the old having a titer test of 180. Previously, the milk of lime was screened over a 20-mesh vibrating wire cloth screen, but with the material produced in accordance with the present invention, no sediment is retained on a 20 mesh screen and only 7% on a 200-mesh screen, with the result that, in commercial practice under the invention, screening of the milk of lime is entirely eliminated.

Where the present invention is used to causticize green liquor in a pulp digesting process, using the slaker as a classifier, it is possible to produce a very dense, fine particle form in the resulting product, consisting of slaked lime, calcium carbonate and other solids, which settle very quickly and may be centrifuged from the white liquor. The actual causticizing, carried out in the slaker, in which the sodium carbonate is converted to caustic soda is performed in less than 50% of the time required in conventional causticizing systems now in use.

The invention, as to process and apparatus is not limited to the details described above and shown in the drawings, but includes all processes and machines coming within the scope of the appended claims and equivalents thereof.

I claim:

1. The method of slaking lime and producing milk of lime which comprises providing at a constant rate a supply of non-slaked lime, providing an overall supply of an aqueous slaking and diluting liquid at a constant predetermined rate, continuously delivering to the total of the supplied lime, a portion of the supplied liquid less than the total but more than enough to complete the slaking of the total of the supplied lime and immediately, preliminarily, continuously, rapidly, and thoroughly mixing said lime and said portion of liquid to associate with each particle of lime a coating of liquid, continuously discharging the mixture from the preliminary mixing, after initiation, but before substantial completion of the slaking reaction, continuously measuring the temperature of the mixture of lime and liquid as it is discharged from the preliminary mixing, maintaining said temperature substantially constant within the desired range by increasing said portion of liquid when said temperature rises and by decreasing the same when said temperature falls, gradually conveying and agitating the preliminarily mixed material for a sufficient time to complete the slaking reaction and to produce a viscous slaked lime slurry, and diluting the slaked lime slurry so produced by continuously delivering thereto the remainder of said overall supply of slaking liquid, said remainder being decreased and increased to compensate for increases and decreases in the delivery of said portion to said preliminary mixing operation and to make constant the overall supply of liquid to the process.

2. The method of slaking lime and producing milk of lime which comprises continuously moving non-slaked lime along a predetermined path at a predetermined constant rate, separately and continuously flowing an aqueous slaking liquid along a predetermined path at a predetermined constant rate, diverting a variable portion of said liquid from said path and delivering the same to the moving lime, immediately, preliminarily, continuously, rapidly, and thoroughly mixing the lime and said portion while moving the same along a common path to associate with each particle of lime a coating of liquid sufficient to initiate slaking thereof, continuously discharging the mixture from the preliminary mixing, after initiation but before completion of the slaking reaction, continuously measuring the temperature of the mixture of lime and liquid at the conclusion of the preliminary mixing thereof, maintaining said temperature within the desired range by increasing the amount of liquid so diverted when the temperature rises and decreasing the amount of liquid so diverted when the temperature falls, continuing the movement of the pre-mixed lime and liquid while agitating the same for a sufficient time to complete the reaction and to produce a viscous slaked lime slurry, thereafter conducting the slaked lime slurry along another predetermined path and delivering the remainder of said liquid thereto to maintain constant the overall supply of liquid to the process and to dilute the slaked lime and to produce a milk of lime of the desired relatively low viscosity.

3. The method of treating calcium oxide to produce a suspension capable of separation in a centrifuge and characterized by particles in the form of minute grains, blocks or granules, as distinguished from thin flakes of relatively large surface area as compared to thickness, which comprises separately supplying calcium oxide and an aqueous liquid at constant predetermined rates, continuously delivering a portion only of the supplied liquid to the total of the supplied calcium oxide, immediately, continuously, preliminarily, rapidly, and thoroughly mixing said portion and said calcium oxide to associate with each particle of the latter, a coating of the liquid, continuously terminating the preliminary mixing and delivering the material therefrom after initiation but before completion of the slaking reaction, continuously measuring the temperature at the conclusion of said preliminary mixing, varying the rate and amount of said portion so delivered in accordance with the measured temperature to maintain said temperature substantially constant at the desired degree, by increasing said portion when the temperature rises and by decreasing the same when the temperature falls, conveying, agitating and further mixing the pre-mixed calcium oxide and liquid and thereby completing the reaction of the calcium oxide and the liquid and producing a viscous suspension having the solid content thereof in the form of minute grains, blocks, or granules as distinguished from flakes, and then diluting the same with the remainder of said supplied liquid to produce a suspension of the desired low viscosity having a relatively high solid content in non-flaky form, capable of being separated from the liquid content in a centrifuge.

4. The method of causticizing green liquor and producing a suspension capable of separation in a centrifuge and characterized by particles in the form of minute grains, blocks or granules, as distinguished from thin flakes of relatively large surface area as compared to thickness, which comprises separately supplying calcium oxide and a green liquor at constant predetermined rates, continuously delivering a portion only of the supplied liquor to the total of the supplied calcium oxide, immediately, continuously, preliminarily, rapidly, and thoroughly mixing said portion and said calcium oxide to associate with each particle of the latter, a coating of the liquor, continuously terminating the preliminary mixing and delivering the material therefrom after initiation but before completion of the reaction, continuously measuring the temperature at the conclusion of said preliminary mixing, varying the rate and amount of said portion so delivered in accordance with the measured temperature to maintain said temperature substantially constant at the desired degree, by increasing said portion when the temperature rises and by decreasing the same when the temperature falls, conveying, agitating and further mixing the pre-mixed calcium oxide and liquor and thereby completing the reaction of the calcium oxide and the liquor and producing a viscous suspension, comprising slaked lime, other solids, and liquid, having the solid content thereof in the form of minute grains, blocks, or granules as distinguished from flakes, and then diluting the same with the remainder of said supplied liquid to produce a suspension of the desired low viscosity having a relatively high solid content in non-flaky form, capable of being separated from the liquid content in a centrifuge.

ROBERT S. WALKER.

REFERENCES CITED

The following references are of record in the file of this patent:

UNITED STATES PATENTS

| Number | Name | Date |
|---|---|---|
| 1,018,404 | Baxter | Feb. 27, 1912 |
| 1,067,686 | Schulthess | July 15, 1913 |
| 1,239,256 | Carson | Sept. 4, 1917 |
| 1,691,511 | Bates | Nov. 13, 1928 |
| 1,796,396 | Rex | Mar. 17, 1931 |
| 1,812,802 | Price | June 30, 1931 |
| 1,815,646 | Bates et al. | July 21, 1931 |
| 1,871,530 | Keller | Aug. 16, 1932 |
| 1,900,253 | Mount | Mar. 7, 1933 |
| 1,917,300 | Hardinge | July 11, 1933 |
| 2,020,098 | Bird | Nov. 5, 1935 |
| 2,062,255 | Brooks | Nov. 4, 1936 |
| 2,149,269 | Brooks et al. | Mar. 7, 1939 |
| 2,178,586 | Joachim | Nov. 7, 1939 |
| 2,211,908 | O'Connor | Aug. 20, 1940 |
| 2,365,736 | Warner | Dec. 26, 1944 |
| 2,375,499 | Shigley | May 8, 1945 |